United States Patent
Mullins et al.

(10) Patent No.: US 9,500,029 B1
(45) Date of Patent: Nov. 22, 2016

(54) LADDER ATTACHMENT FOR TRUCKS

(71) Applicants: Darin Alan Mullins, Crowley, TX (US); William Emmett Mullins, Crowley, TX (US)

(72) Inventors: Darin Alan Mullins, Crowley, TX (US); William Emmett Mullins, Crowley, TX (US)

(*) Notice: Subject to any disclaimer, the term of this patent is extended or adjusted under 35 U.S.C. 154(b) by 0 days.

(21) Appl. No.: 14/495,715

(22) Filed: Sep. 24, 2014

Related U.S. Application Data (60) Provisional application No. 61/882,881, filed on Sep. 26, 2013.

(51) Int. Cl.
| | |
|---|---|
| *E06C 5/00* | (2006.01) |
| *E06C 1/12* | (2006.01) |
| *E06C 1/393* | (2006.01) |
| *E06C 5/02* | (2006.01) |
| *E06C 5/24* | (2006.01) |
| *E06C 1/34* | (2006.01) |
| *E06C 7/48* | (2006.01) |
| *B60R 3/00* | (2006.01) |
| *E06C 7/16* | (2006.01) |
| *E06C 5/04* | (2006.01) |
| *E06C 7/50* | (2006.01) |

(52) U.S. Cl.
CPC ............... *E06C 1/393* (2013.01); *B60R 3/007* (2013.01); *E06C 1/34* (2013.01); *E06C 5/02* (2013.01); *E06C 5/04* (2013.01); *E06C 5/24* (2013.01); *E06C 7/16* (2013.01); *E06C 7/48* (2013.01); *E06C 7/505* (2013.01)

(58) Field of Classification Search
CPC ........ A01M 31/02; B60R 3/007; E06C 1/04; E06C 1/12; E06C 1/34; E06C 1/36; E06C 5/00; E06C 7/16; E06C 7/48; E06C 7/484; E06C 1/393; E06C 5/04; E06C 5/24; E06C 7/488; E06C 7/505; E06C 1/125; E06C 1/39; E06C 5/02; B63B 27/14
See application file for complete search history.

(56) References Cited

U.S. PATENT DOCUMENTS

| | | | | | |
|---|---|---|---|---|---|
| 2,485,413 | A | * | 10/1949 | Ross ....................... | B60R 3/007 182/201 |
| 2,679,436 | A | * | 5/1954 | Viebrock ................ | B60R 3/007 182/150 |
| 2,701,168 | A | * | 2/1955 | Schemers ..................... | 182/116 |
| 2,772,720 | A | * | 12/1956 | Zody ....................... | B62B 5/085 182/129 |
| 2,851,312 | A | * | 9/1958 | Hoff ............................. | 182/132 |
| 2,872,252 | A | * | 2/1959 | Konkle ......................... | 182/131 |
| 2,923,373 | A | * | 2/1960 | Ledgerwood ................. | 182/102 |

(Continued)

*Primary Examiner* — Daniel Cahn
(74) *Attorney, Agent, or Firm* — Plager Schack LLP (57) ABSTRACT

An adjustable ladder attachment able to be secured to a vehicle to enhance user stability and safety when servicing the vehicle. The ladder attachment includes an outer ladder assembly with a pair of rails connected by steps, an inner ladder assembly with a pair of rails connected by steps, the inner ladder assembly rails being slidably mounted to the outer ladder assembly rails to one of a plurality of locking positions, and a platform rotatably mounted to a top portion of the inner ladder assembly. The outer ladder assembly is positioned on a ground surface proximate the vehicle and the platform is rotatably adjusted to rest on top of a tire of the vehicle, thereby enabling a user to stand on the platform or the steps of the ladder assemblies.

9 Claims, 5 Drawing Sheets

(56) References Cited

U.S. PATENT DOCUMENTS

| | | | | |
|---|---|---|---|---|
| 2,957,541 A * | 10/1960 | Everest | E06C 1/34 |
| | | | 182/115 |
| 3,078,952 A * | 2/1963 | Kelling | 182/150 |
| 3,139,154 A * | 6/1964 | Ewald | 182/106 |
| 3,630,314 A * | 12/1971 | Bamburg et al. | 182/116 |
| 4,057,125 A * | 11/1977 | Kroft | B60R 3/007 |
| | | | 182/206 |
| 4,418,793 A * | 12/1983 | Brent | 182/129 |
| 4,530,419 A * | 7/1985 | Rumage et al. | 182/106 |
| 4,721,319 A * | 1/1988 | Dale | B60R 3/007 |
| | | | 182/92 |
| 4,825,975 A * | 5/1989 | Symes | B60R 3/007 |
| | | | 182/150 |
| 4,911,264 A * | 3/1990 | McCafferty | 182/92 |
| 4,947,961 A * | 8/1990 | Dudley | B60R 3/007 |
| | | | 182/150 |
| 5,072,955 A * | 12/1991 | Holland et al. | 280/32.5 |
| 5,161,640 A * | 11/1992 | Holbrooks | B60R 3/007 |
| | | | 182/113 |
| 5,544,718 A * | 8/1996 | Schumacher | 182/129 |
| 5,669,463 A * | 9/1997 | Robertson | 182/116 |
| 5,887,540 A * | 3/1999 | Krish, Jr. | B60R 3/005 |
| | | | 114/362 |
| 6,044,928 A * | 4/2000 | Law | B60R 3/007 |
| | | | 182/150 |
| D448,335 S * | 9/2001 | Ehnes | D12/203 |
| D456,747 S * | 5/2002 | Louie | D12/106 |
| 6,422,344 B1 * | 7/2002 | Cox | E06C 1/32 |
| | | | 182/107 |
| 6,533,069 B1 * | 3/2003 | Couillard | 182/83 |
| 6,550,578 B1 * | 4/2003 | Law et al. | 182/150 |
| 7,210,558 B2 * | 5/2007 | Eaves | 182/115 |
| 2004/0140156 A1 * | 7/2004 | Moss | E06C 1/22 |
| | | | 182/180.2 |
| 2005/0224287 A1 * | 10/2005 | LaBrash | E06C 1/34 |
| | | | 182/84 |
| 2007/0227819 A1 * | 10/2007 | Layfield | 182/206 |
| 2010/0012431 A1 * | 1/2010 | Ehnes | B60R 3/007 |
| | | | 182/150 |
| 2010/0122871 A1 * | 5/2010 | Gottlinger | E06C 5/02 |
| | | | 182/106 |
| 2012/0279802 A1 * | 11/2012 | Filkowski | E06C 1/12 |
| | | | 182/127 |

\* cited by examiner

LADDER ATTACHMENT FOR TRUCKS

RELATED APPLICATION

The application claims priority to provisional patent application U.S. Ser. No. 61/882,881 filed on Sep. 26, 2013, the entire contents of which is herein incorporated by reference.

BACKGROUND

The embodiments herein relate generally to ladders.

Large vehicles such as trucks including semi-trailers, flatbed trailers or box trailers can be difficult to service due to the height of the vehicles. An individual will often use a ladder to climb up to an appropriate height to complete tasks such as changing light bulbs or servicing the engine. There exist a variety of extension ladders and A-frame ladders. However, these ladders are disadvantageous because they cannot effectively be secured to the truck. The unstable ladder increases the chance a user will fall down when servicing the vehicle and suffer an injury and/or death.

As such, there is a need in the industry for a ladder attachment that effectively secures to a large vehicle such as a truck, which addresses the limitations of the prior art.

SUMMARY

An adjustable ladder attachment configured to be secured to a vehicle to enhance user stability and safety when servicing the vehicle. The ladder attachment comprises an outer ladder assembly comprising a pair of rails oriented parallel to one another and connected by a plurality of steps, an inner ladder assembly comprising a pair of rails oriented parallel to one another and connected by a plurality of steps, the inner ladder assembly rails being slidably mounted to the outer ladder assembly rails to one of a plurality of locking positions, and a platform rotatably mounted to a top portion of the inner ladder assembly, wherein the outer ladder assembly is configured to be positioned on a ground surface proximate the vehicle and the platform is configured to rotatably adjust to rest on top of a tire of the vehicle, thereby enabling a user to stand on the platform or the steps of the ladder assemblies.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
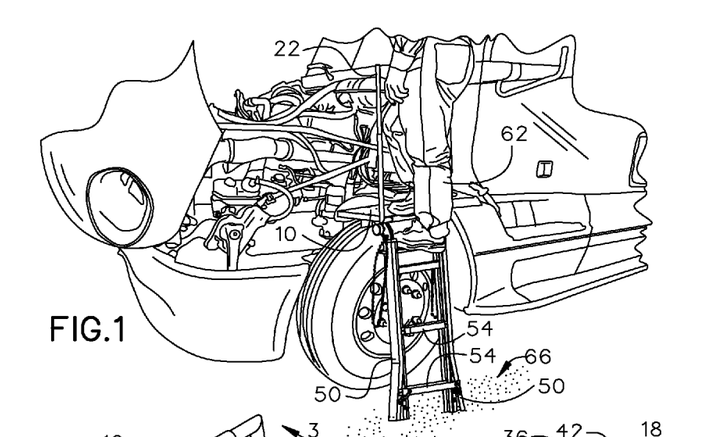
FIG. 1 depicts a perspective view of embodiments of the ladder attachment shown in use.
Figure 2:
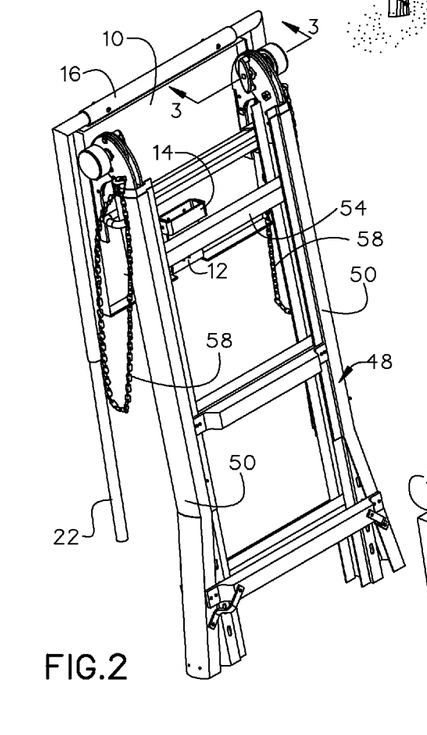
FIG. 2 depicts a perspective view of certain embodiments of the ladder attachment.

As depicted in FIGS. 1-2, the ladder attachment is configured for use with a vehicle by operator 62 when positioned on ground 66. In a preferred embodiment, the vehicle may be any type of truck known in the field. Alternatively, the ladder attachment may be used with any type of vehicle. The ladder attachment comprises main platform 10, main platform forward plate 12, main platform forward plate lock bracket 14, handle 22, main platform handle slot pipe 16, inner extension assembly 26, outer extension assembly 48, outer extension assembly side rails 50, outer extension assembly steps 54 and securement chains 58.

Figures 20, 21:
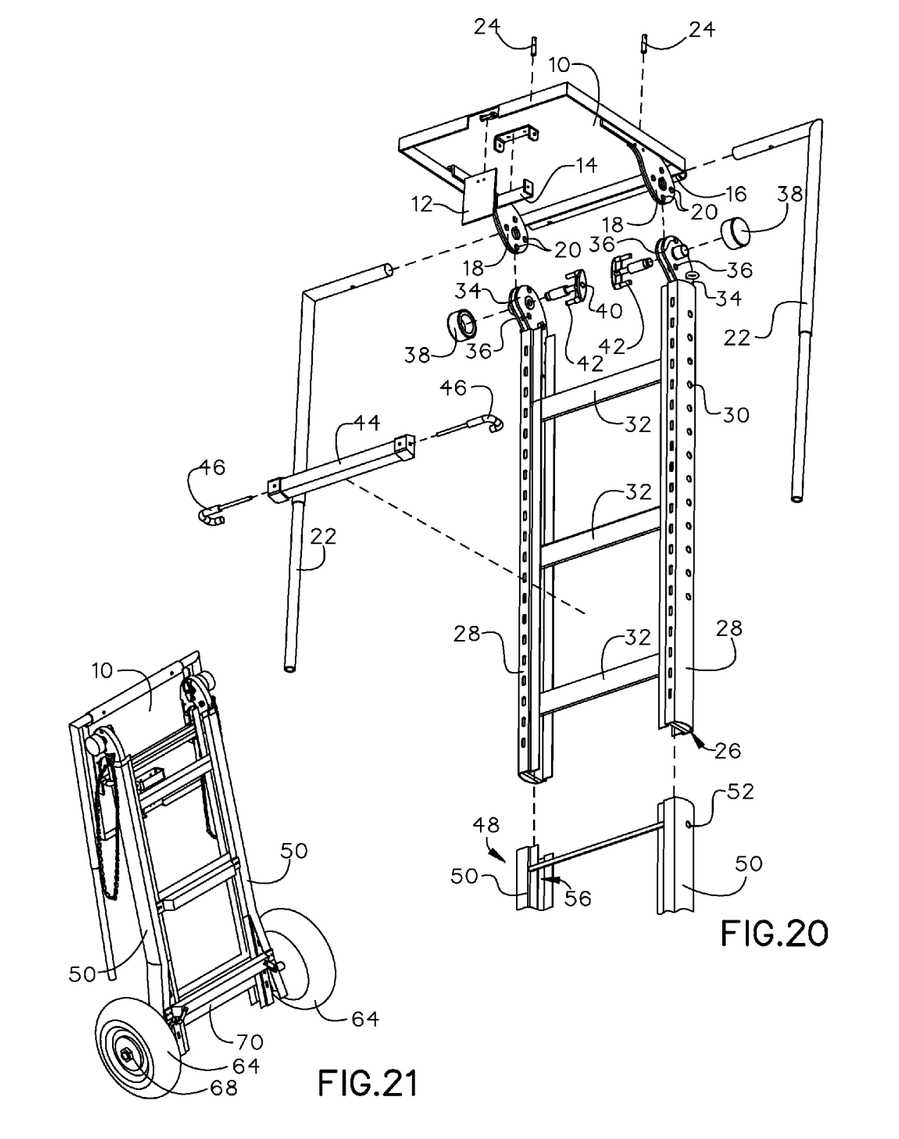
FIG. 20 depicts an exploded view of certain embodiments of the ladder attachment.
FIG. 21 depicts a perspective view of an alternative embodiment of the ladder attachment.

As depicted in FIGS. 3-6 and the FIG. 20 exploded view, main platform 10 is rotatably mounted to inner extension assembly 26. In a preferred embodiment, main platform 10 is configured to rest against outer extension assembly 48 in a compact position depicted in FIG. 2 and rotate 90 degrees up to rest on a tire of the vehicle as depicted in FIG. 1. It shall be appreciated that any alternative range of degrees is possible for this adjustment. A pair of pivot alignment brackets 18 comprising pivot alignment bracket holes 20 is affixed to the bottom of main platform 10. A pair of T-lock pivot brackets 34 oriented parallel to one another is affixed to each inner extension assembly side rail 28. T-lock pivot brackets 34 comprise a set of T-lock pivot holes 36. Each pivot alignment bracket 18 is configured to rotatably adjust within each pair of T-lock pivot brackets 34 affixed to inner extension assembly side rails 28.

A locking mechanism is operably connected to each pair of T-lock pivot brackets 34 and pivot alignment bracket 18. The locking mechanism comprises T-lock main bracket 40 and T-lock button 38. T-lock main bracket 40 comprises T-lock stems 42 and a center shaft. T-lock stems 42 are configured to slidably engage and disengage with T-lock pivot holes 36 and pivot alignment bracket hole 20. The center shaft of T-lock main bracket 40 is disposed within center openings in T-lock pivot brackets 34 and pivot alignment bracket 18.

Figure 3:
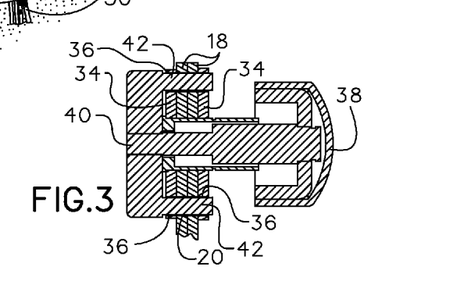
FIG. 3 depicts a section view of certain embodiment of the ladder attachment along line 3-3 in FIG. 2.
Figure 4:
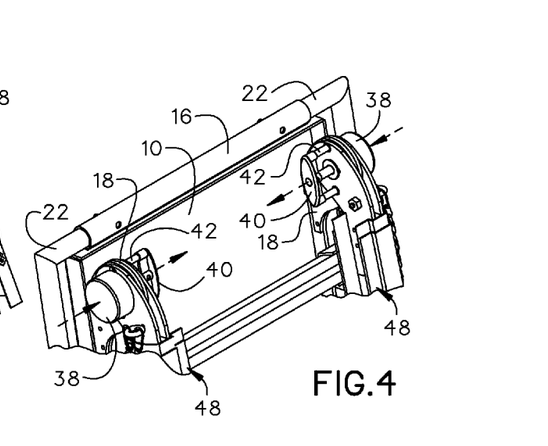
FIG. 4 depicts a perspective view of certain embodiments of the ladder attachment depicting an engagement of T-lock main bracket 40.
Figures 5, 6, 7, 8:
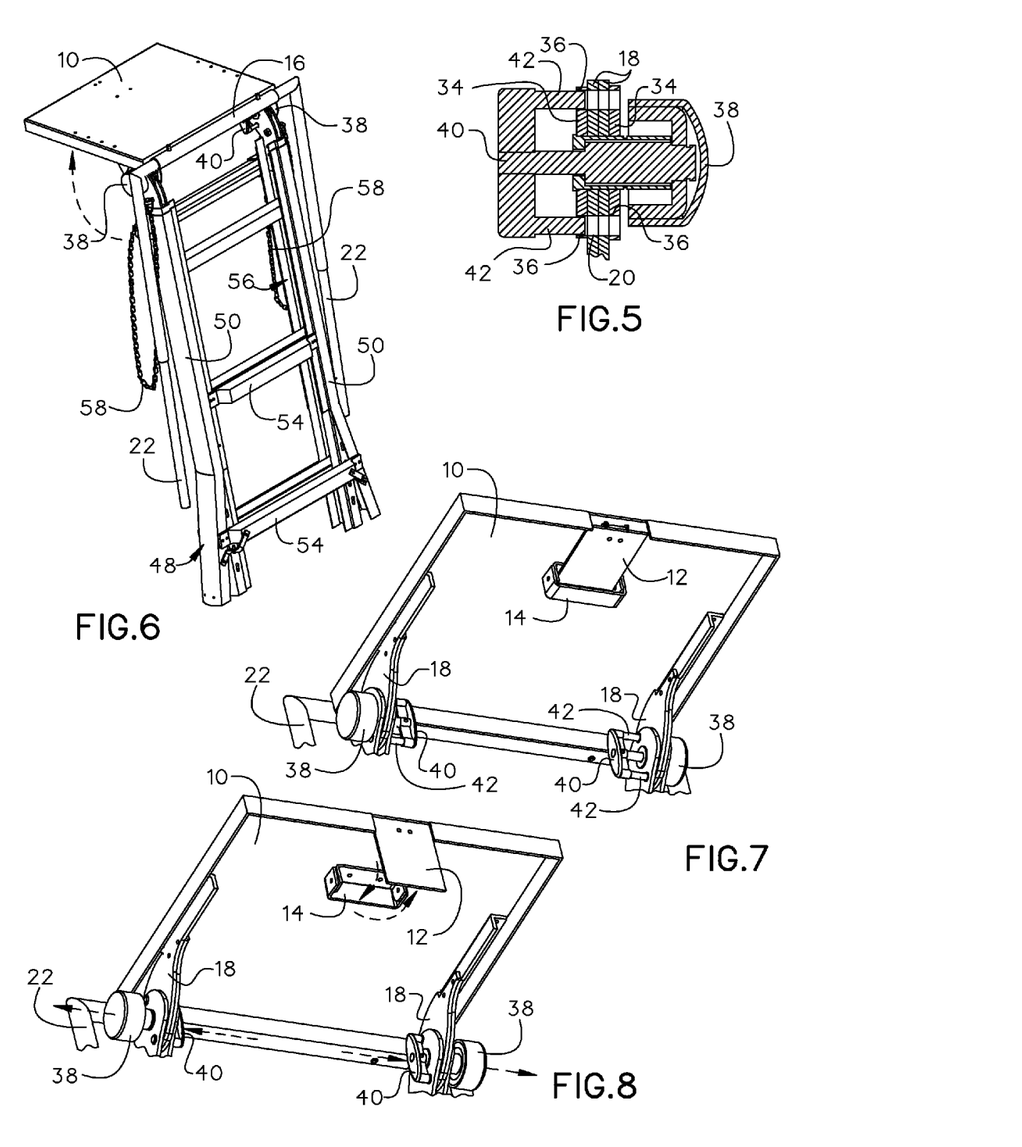
FIG. 5 depicts a section view of certain embodiments of the ladder attachment depicting a disengagement of T-lock main bracket 40.
FIG. 6 depicts a perspective view of certain embodiments of the ladder attachment depicting the rotation of main platform 10.
FIG. 7 depicts a bottom perspective view of certain embodiments of the ladder attachment.
FIG. 8 depicts a bottom perspective view of certain embodiments of the ladder attachment.
Figure 9:
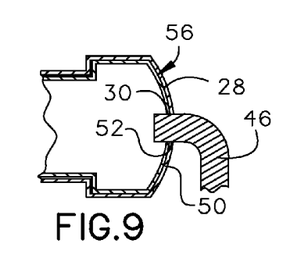
FIG. 9 depicts a section view of certain embodiments of the ladder attachment depicting an engagement of J-lock hook 46.

FIG. 3 depicts the locking mechanism in a locked position in which T-lock stems 42 are engaged with T-lock pivot holes 36 and pivot alignment bracket hole 20. This prevents the rotation of pivot alignment brackets 18 and main platform 10. It shall be appreciated that a spring (not shown) is operably connected to each T-lock button 38 and T-lock main bracket 40 to enable T-lock stems 42 to engage and disengage with T-lock pivot holes 36 and pivot alignment bracket hole 20 as needed. As depicted in FIG. 4, a user depresses T-lock buttons 38 to engage T-lock stems 42 with the holes and depresses T-lock buttons 38 again to disengage T-lock stems 42 from the holes. FIG. 5 depicts the disengagement of T-lock stems 42 from pivot alignment bracket hole 20 and T-lock pivot holes 36. This enables operator 62 to rotate main platform 10 up as depicted in FIG. 6. Operator 62 can then depress T-lock buttons 38 to engage T-lock stems 42 with pivot alignment bracket holes 20 and T-lock pivot holes 36 to lock main platform 10.

As depicted in FIG. 7, main platform forward plate 12 is shown in a storage position within main platform forward plate lock bracket 14. As depicted in FIG. 8, main platform forward plate lock bracket 14 may be rotatably adjusted to enable main platform forward plate 12 to rotate 90 degrees outward. This allows main platform forward plate 12 to rest against the inner edge of the vehicle's tire when main platform 10 is resting on top of the tire. This further enhances the stability of the ladder attachment and prevents movement of the ladder away from the vehicle. FIG. 8 also depicts the re-engagement of T-lock main bracket 40 with pivot alignment bracket holes 20 and T-lock pivot holes 36 after T-lock buttons 38 are depressed.

Inner extension assembly 26 is slidably mounted to outer extension assembly 48 and can be adjusted to position main platform 10 at a desired height. Inner extension assembly side rails 28 are slidably adjusted within outer extension slide slot 56 of outer extension assembly side rails 50. Once adjusted, inner extension assembly 26 and outer extension assembly 48 are locked into position by inserting J-lock hook 46 through outer extension assembly side rail lock hole 52 and inner extension assembly side rail lock hole 30.

Figures 10, 11, 12, 13:
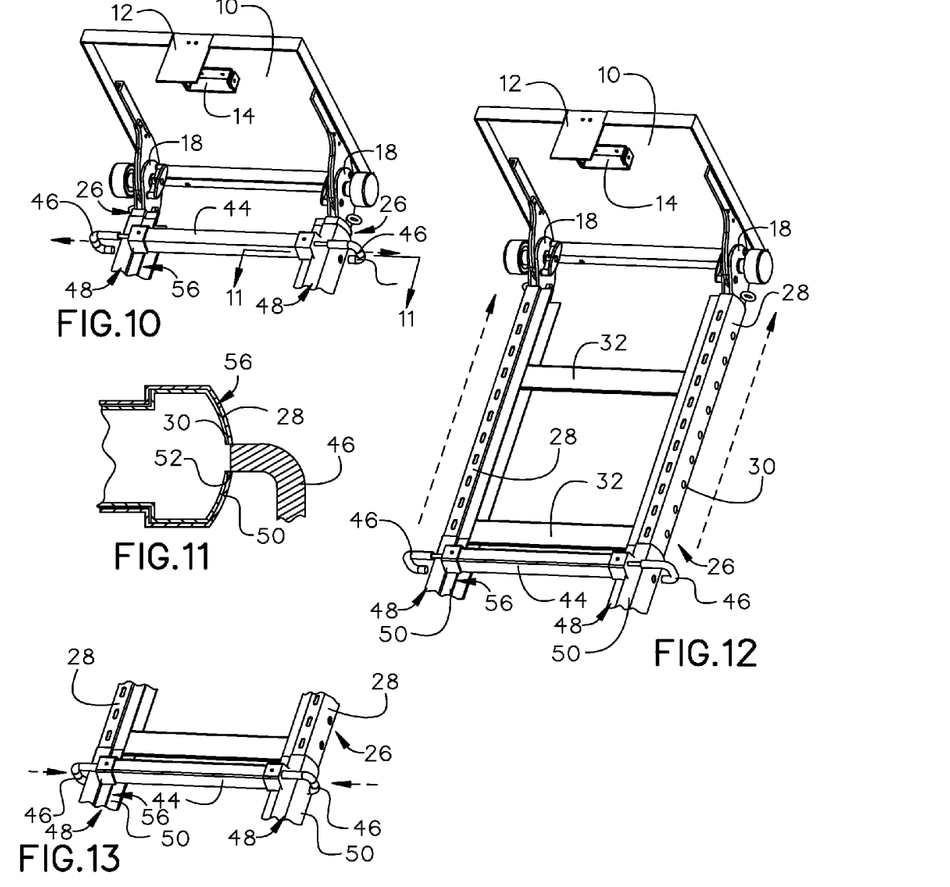
FIG. 10 depicts a bottom perspective view of certain embodiments of the ladder attachment depicting a disengagement of J-lock hooks 46.
FIG. 11 depicts a section view of certain embodiments of the ladder attachment taken along line 11-11 in FIG. 10.
FIG. 12 depicts a bottom perspective view of certain embodiments of the ladder attachment depicting an extension of the ladder.
FIG. 13 depicts a bottom perspective view of certain embodiments of the ladder attachment depicting a re-engagement of J-lock hooks 46.

As depicted in FIG. 10, a pair of J-lock hooks 46 is operably connected to J-lock bar 44, which is affixed to outer extension assembly 48. J-lock hooks 46 are operably connected to J-lock bar 44 by springs (not shown) housed within. This enables a user to pull J-lock hooks 46 outward to disengage the hooks from outer extension assembly side rail lock holes 52 and inner extension assembly side rail lock holes 30. Once the user releases J-lock hooks 46, the springs retract the hooks to enable them to engage with outer extension assembly side rail lock holes 52 and inner extension assembly side rail lock holes 30 again. FIG. 11 depicts the disengagement of J-lock hook 46 from outer extension assembly side rail lock hole 52 and inner extension assembly side rail lock hole 30. Once disengaged, inner extension assembly side rails 28 are slidably adjusted with respect to outer extension assembly side rails 50 until the desired inner extension assembly side rail holes 30 are aligned with corresponding outer extension assembly side rail lock holes 52 as shown in FIG. 12. As depicted in FIG. 13, J-lock hooks 46 are then released to secure inner extension assembly 26 and outer extension assembly 48 together in the locked position.

Figures 14, 15, 16, 17, 18, 19:
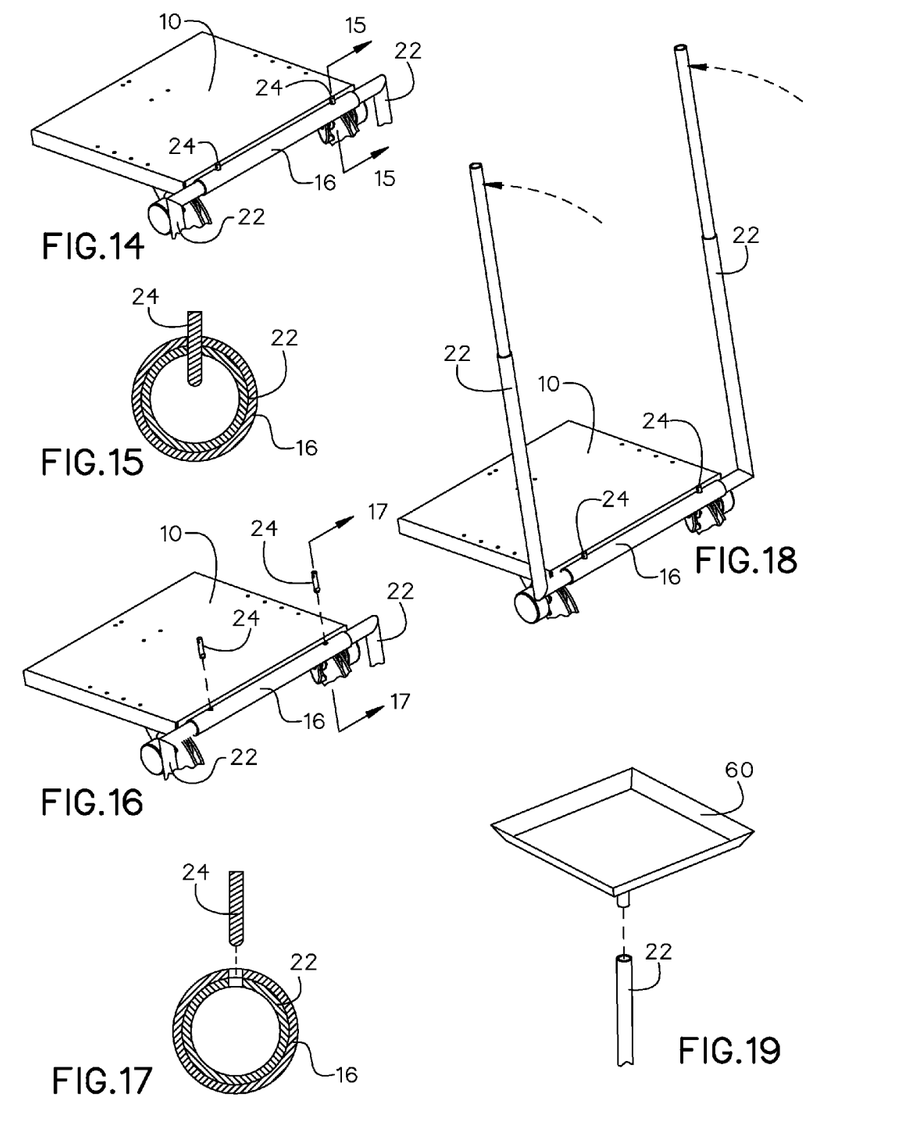
FIG. 14 depicts a top perspective view of certain embodiments of the ladder attachment.
FIG. 15 depicts a section view of certain embodiments of the ladder attachment along line 15-15 in FIG. 14.
FIG. 16 depicts a perspective exploded view of certain embodiments of the ladder attachment depicting the removal of handle lock pins 24.
FIG. 17 depicts a section view of certain embodiments of the ladder attachment along line 17-17 in FIG. 16.
FIG. 18 depicts a perspective view of certain embodiments of the ladder attachment depicting the rotation of handle 22 to a locked position.
FIG. 19 depicts a perspective view of certain embodiments of the ladder attachment.

As depicted in FIG. 14, main platform handle slot pipe 16 is affixed to an edge of main platform 10. Handle 22 comprises a U-shape and is disposed within main platform handle slot pipe 16. This allows handle 22 to rotatably adjust up or down. Once handle 22 is oriented in the desired position, handle lock pins 24 are used to secure main platform handle slot pipe 16 and handle 22 together in a locked position. FIGS. 14-15 depict main platform handle slot pipe 16 and handle 22 in a locked position. FIGS. 16-17 depict main platform handle slot pipe 16 and handle 22 in an unlocked position. FIG. 18 depicts the rotation of handle 22 and the insertion of handle lock pins 24 into main platform handle slot pipe 16 and handle 22. This configuration is desirable because it provides a four-point contact between operator 62 and the ladder attachment. Operator 62 can position both hands on handle 22 and both feet on main platform 10, inner extension assembly steps 32 or outer extension assembly steps 54. In one embodiment, pan 60 may be detachably coupled to one of the ends of handle 22 as depicted in FIG. 19. This allows operator 62 to store any tools or accessories on pan 60 when servicing the vehicle.

To operate the ladder attachment, operator 62 places outer extension assembly 48 on ground 66 proximate the vehicle. Inner extension assembly side rails 28 are slidably adjusted with respect to outer extension assembly side rails 50 and locked into place when main platform 10 is positioned at the height of a vehicle's tire. Main platform forward plate 12 is adjusted to rest against the inner edge of the vehicle's tire. Main platform 10 is rotatably adjusted to rest on top of the tire and locked into place. Handle 22 is rotated to an upright position and locked into place. This configuration is shown in FIG. 1. To further enhance the stability of the ladder attachment, securement chains 58 can be tied around any portion of the vehicle such as a flat bed, box trailer or Department of Transportation regulated bumper. A four-point contact between operator 62 and the ladder attachment is established in which both hands can be placed on handle 22 and both feet can rest on main platform 10, inner extension assembly steps 32 or outer extension assembly steps 54. As a result, the ladder attachment provides operator 62 with a stable platform to service the vehicle. Alternatively, it shall be appreciated that the ladder attachment may be used on the side of the vehicle's flatbed, drop decks, box van trailers, or the like.

FIG. 21 depicts an alternative embodiment in which the ladder attachment may comprise tires 64 operably connected to outer extension assembly side rails 50 by rod 70 and nuts 68. This allows operator 62 to easily transport the ladder attachment. It shall be appreciated that the ladder attachment may also be used to transport any items that can be secured to inner extension assembly steps 32 and/or outer extension assembly steps 54 by straps or alternate fastening components.

It shall be appreciated that the components of the ladder attachment described in several embodiments herein may comprise any alternative known materials in the field and be of any color, size and/or dimensions. It shall be appreciated that the components of the ladder attachment described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An adjustable ladder attachment configured to be secured to a vehicle to enhance user stability and safety when servicing the vehicle, the ladder attachment comprising:
   an outer ladder assembly comprising a pair of rails oriented parallel to one another and connected by a plurality of steps;
   an inner ladder assembly comprising a pair of rails oriented parallel to one another and connected by a plurality of steps, the inner ladder assembly rails being slidably mounted to the outer ladder assembly rails to one of a plurality of locking positions;
   a platform pivotably mounted to a top portion of the inner ladder assembly and comprising a front edge, a rear edge opposite the front edge, and a pair of side edges extending between the front and rear edges, the rear edge being on a rear portion of the platform directly coupled to the inner ladder assembly;
   a generally rectangular plate pivotably mounted to the front edge of the platform and comprising a front edge, a rear edge opposite the front edge of the plate and directly coupled to the platform, and side edges extending between the front and rear edges of the plate;
   a lock bracket rotatably mounted to a bottom portion of the platform and comprising a pair of C-brackets, the first C-bracket of the pair of C-brackets being directly coupled to the platform, the second C-bracket of the pair of C-brackets rotatably mounted to the first C-bracket, wherein the second C-bracket is configured to rotatably adjust relative to the first C-bracket to a first position to create an opening sufficient to receive the front edge of the rectangular plate after a pivotal adjustment of the plate, wherein the second C-bracket is configured to rotatably adjust relative to the first C-bracket to a second position to secure the front edge of the rectangular plate in a locked position within the pair of C-brackets;
   wherein the outer ladder assembly is configured to be positioned on a ground surface proximate the vehicle and the platform is configured to pivotably adjust to rest on top of a tire of the vehicle, wherein the second C-bracket of the lock bracket is configured to rotatably adjust to the first position to permit the rectangular plate to pivot away from the pair of C-brackets until a face of the plate rests against an inner edge of the tire, thereby enabling a user to stand on the platform or the steps of the ladder assemblies.

2. The adjustable ladder attachment of claim 1, further comprising a first pivot alignment bracket and a second pivot alignment bracket both affixed to the bottom portion of the platform.

3. The adjustable ladder attachment of claim 2, wherein a first rail of the pair of rails of the first inner ladder assembly comprises a first pair of pivot brackets and a second rail of the pair of rails of the first inner ladder assembly comprises a second pair of pivot brackets, wherein each pair of pivot brackets are oriented substantially parallel to one another to enable the first pivot alignment bracket to be rotatably adjusted between the first pair of pivot brackets and the second pivot alignment bracket to be rotatably adjusted between the second pair of pivot brackets.

4. The adjustable ladder attachment of claim 3, further comprising a first T-shaped lock bracket and a second T-shaped lock bracket, each T-shaped lock bracket comprising at least one stem, wherein the at least one stem of the first T-shaped lock bracket is configured to slidably engage with apertures in both the first pair of pivot brackets and the first pivot alignment bracket, wherein the at least one stem of the second T-shaped lock bracket is configured to slidably engage with apertures in both the second pair of pivot brackets and the second pivot alignment bracket.

5. The adjustable ladder attachment of claim 4, further comprising a pipe coupled to the rear edge of the platform, and a substantially U-shaped handle rotatably mounted within the pipe.

6. The adjustable ladder attachment of claim 5, further comprising at least one chain coupled to the inner ladder assembly, wherein the at least one chain is configured to be secured to the vehicle.

7. The adjustable ladder attachment of claim 6, further comprising a pan detachably coupled to an end of the U-shaped handle.

8. The adjustable ladder attachment of claim 1, further comprising a pair of tires rotatably mounted to a bottom portion of the outer ladder assembly.

9. An adjustable ladder attachment configured to be secured to a vehicle to enhance user stability and safety when servicing the vehicle, the ladder attachment comprising:
   an outer ladder assembly comprising a pair of rails oriented parallel to one another and connected by a plurality of steps;
   an inner ladder assembly comprising a pair of rails oriented parallel to one another and connected by a plurality of steps, the inner ladder assembly rails being slidably mounted to the outer ladder assembly rails to one of a plurality of locking positions, a first rail of the pair of rails of the inner ladder assembly comprising a first pair of pivot brackets directly coupled thereto and a second rail of the pair of rails of the inner ladder assembly comprising a second pair of pivot brackets directly coupled thereto, each pair of pivot brackets of the first and second pairs of pivot brackets being oriented substantially parallel to one another and comprising a plurality of aligned holes;
   a platform pivotably mounted to a top portion of the inner ladder assembly and comprising a front edge, a rear edge opposite the front edge, and a pair of side edges extending between the front and rear edges, the rear edge being on a rear portion of the platform directly coupled to the inner ladder assembly, the platform comprising a first pivot alignment bracket and a second pivot alignment bracket both directly coupled to a bottom of the platform, each pivot alignment bracket of the first and second pivot alignment brackets comprising a plurality of holes disposed along a circular pathway and rotatably adjusted between either one of the pairs of pivot brackets;
   a first T-shaped lock bracket operably connected to the first pair of pivot brackets and the first pivot alignment bracket, the first T-shaped lock bracket comprising at least one stem configured to slidably engage with any of the plurality of aligned holes in the first pair of pivot brackets and one of the plurality of holes in the first pivot alignment bracket, thereby supporting the platform in a desired position;
   a second T-shaped lock bracket operably connected to the second pair of pivot brackets and the second pivot alignment bracket, the second T-shaped lock bracket comprising at least one stem configured to slidably engage with any of the plurality of aligned holes in the second pair of pivot brackets and one of the plurality of holes in the second pivot alignment bracket, thereby supporting the platform in the desired position;

a generally rectangular plate pivotably mounted to the front edge of the platform and comprising a front edge, a rear edge opposite the front edge of the plate and directly coupled to the platform, and side edges extending between the front and rear edges of the plate;

a lock bracket rotatably mounted to a bottom portion of the platform and comprising a pair of C-brackets, the first C-bracket of the pair of C-brackets being directly coupled to the platform, the second C-bracket of the pair of C-brackets rotatably mounted to the first C-bracket, wherein the second C-bracket is configured to rotatably adjust relative to the first C-bracket to a first position to create an opening sufficient to receive the front edge of the rectangular plate after a pivotal adjustment of the plate, wherein the second C-bracket is configured to rotatably adjust relative to the first C-bracket to a second position to secure the front edge of the rectangular plate in a locked position within the pair of C-brackets;

wherein the outer ladder assembly is configured to be positioned on a ground surface proximate the vehicle and the platform is configured to pivotably adjust to rest on top of a tire of the vehicle, wherein the second C-bracket of the lock bracket is configured to rotatably adjust to the first position to permit the rectangular plate to pivot away from the pair of C-brackets until a face of the plate rests against an inner edge of the tire, thereby enabling a user to stand on the platform or the steps of the ladder assemblies.

* * * * *